United States Patent
Bauer et al.

(10) Patent No.: US 6,504,610 B1
(45) Date of Patent: Jan. 7, 2003

(54) METHOD AND SYSTEM FOR POSITIONING AN AUTONOMOUS MOBILE UNIT FOR DOCKING

(75) Inventors: Rudolf Bauer, Neubiberg (DE); Björn Magnussen, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/355,055

(22) PCT Filed: Jan. 9, 1998

(86) PCT No.: PCT/DE98/00071

§ 371 (c)(1),
(2), (4) Date: Jul. 22, 1999

(87) PCT Pub. No.: WO98/33103

PCT Pub. Date: Jul. 30, 1998

(30) Foreign Application Priority Data

Jan. 22, 1997 (DE) .......................... 197 02 120

(51) Int. Cl.⁷ ............................................ G01B 11/00
(52) U.S. Cl. ........................................ 356/399; 356/400
(58) Field of Search ................................ 356/399–401

(56) References Cited

U.S. PATENT DOCUMENTS

| | | | | |
|---|---|---|---|---|
| 4,295,740 A | * | 10/1981 | Sturges, Jr. .................. | 356/152 |
| 4,627,511 A | | 12/1986 | Yajima ........................ | 180/167 |
| 4,679,152 A | | 7/1987 | Perdue ........................ | 364/424 |
| 4,788,440 A | | 11/1988 | Pryor ........................ | 250/561 |
| 4,926,050 A | * | 5/1990 | Shemwell .................... | 250/560 |
| 4,938,495 A | | 7/1990 | Beasley et al. .............. | 280/477 |
| 5,026,153 A | | 6/1991 | Suzuki et al. ................. | 356/1 |
| 5,052,799 A | | 10/1991 | Sasser et al. ................ | 356/152 |
| 6,097,476 A | * | 8/2000 | Kato et al. .................. | 356/4.01 |

FOREIGN PATENT DOCUMENTS

| | | |
|---|---|---|
| DE | 44 21 805 C1 | 2/1995 |
| DE | 195 21 358 C1 | 9/1996 |
| EP | 0 307 381 | 3/1989 |

OTHER PUBLICATIONS

Patent Abstracts of Japan—08015412—Jan. 19, 1996.

* cited by examiner

*Primary Examiner*—Michael P. Stafira
(74) *Attorney, Agent, or Firm*—Bell, Boyd & Lloyd LLC

(57) ABSTRACT

A system and a method for positioning an autonomous mobile unit for docking, wherein a slot-shaped light beam which stands perpendicular to the drive surface of the unit is provided, which beam is emitted by a docking device, and position-sensitive detectors for this light beam are present on the unit, these being arranged parallel to the drive surface of the unit. With the aid of the light beam and of the detectors, the precise rotation (beta) of the unit relative to the docking device can be determined, whereby the unit learns its approximate configuration in space by means of ultrasound or odometry measurements. With this guidance, the unit can dock very precisely at a docking device in order to be able to take on goods or to drive into a garage, for example. Position-sensitive detectors, or photodiodes are provided as receptors for the light beam. The present invention preferably can be used in household robots or in industrial cleaning robots.

21 Claims, 4 Drawing Sheets

METHOD AND SYSTEM FOR POSITIONING AN AUTONOMOUS MOBILE UNIT FOR DOCKING

BACKGROUND OF THE INVENTION

1. Field of the Invention

The present invention relates to a system and a method with which autonomous mobile units can be moved into a parked position wherein an orientation aid is used for controlling such position.

2. Description of the Prior Art

Autonomous mobile units can be employed in office, hospital or industrial settings in order to perform simple activities such as those relating to transport, remote manipulation, or cleaning. Given the use of autonomous mobile robots of this type, it is particularly desirable for them to be able to dock in a precise manner in order to take on or deliver cargo, to perform a battery change, or to replace the cleaning device in a cleaning machine. Another instance of docking can occur when the autonomous mobile unit drives into a garage in which it waits until further requests for action are directed to it. During this wait time, for example, an accumulator that is provided in the autonomous mobile unit can be charged, or a self-diagnosis of the device can be executed.

Various methods and devices for position detection of mobile units are taught by, for example U.S. Pat Nos. 4,679,152, 4,627,511, 4,938,495, and European Patent No. EP-A-0736 630.

The device for position detection described in U.S. Pat. No. 4,938,495 is used in the framework of a coupling process of a member of a train device.

In the method taught by European Patent No. EP-A-0736 630, which is used in the framework of renewing an existing striping on a road, an angle is determined that is circumscribed by a street marking machine and the present striping.

A problem that arises in the docking of such units described in these references is that the device must be brought from an arbitrary starting configuration into a strictly defined end position. Known autonomous mobile units such as those described in the German patent P 44 21 805 orient by themselves using ultrasound sensors and by using odometry measurements that are performed at a wheel of the unit. During the device's journey from a starting point to a target point, the configuration errors which are caused by the imprecisions of the sensor in the odometry measurements and in the ultrasound distance measurements add up, so that before long a precise orientation is no longer possible unless countermeasures are taken. In the cited patent, countermeasures are taken in that different actions to be performed by the autonomous mobile unit are evaluated, and the configuration error is monitored. If too large an error arises, corrective measures are initiated.

Another problem is that the autonomous mobile unit in a docking station should preferably dock in a very specific rotational orientation and with a very specific exterior. But autonomous mobile units of this type usually have three-wheel kinematics, which does not enable them to move forward arbitrarily on a movement underlay. The three-wheel kinematics of autonomous mobile units is discussed in the German patent 195 21 358, for example. There, the slippage that builds up along a planned travel path of such an autonomous mobile unit is additionally detected.

The present invention is therefore directed to a system and a method with which an autonomous mobile unit can be moved into a defined end position in a docking station.

SUMMARY OF THE INVENTION

Such object is achieved in a system and method wherein a good orientation aid is made available by the application of a slot-shaped light beam, which is situated perpendicular to the movement underlay of the unit, in connection with a position-sensitive detector for this light beam, which is attached parallel to the unit's driving face, such that it is possible with such orientation aid to directly generate a signal for a drive path control of the unit for controlling the docking position.

Specifically, in an embodiment of the present invention, a system for positioning an autonomous mobile unit for docking is provided, which includes: a transmitter and a detector wherein one of the transmitter and the detector is arranged at the autonomous mobile unit and the other of the transmitter and the detector is arranged at a docking device, the transmitter emitting a slot-shaped light beam which is substantially perpendicular to a drive surface of the autonomous mobile unit, the detector including at least one position detector which is oriented substantially parallel to the drive surface for detecting a position of the light beam; and an evaluator which receives data from the detector and evaluates a change of relative position of the light beam with respect to the detector to control movement of the autonomous mobile unit wherein the light beam assumes a particular position on the position detector.

In an embodiment, the system includes means for determining a docking interval between the autonomous mobile unit and the docking device; and an actuator for activating the transmitter given a failure to exceed a first docking interval.

In an embodiment of the system, the detector includes at least two position detectors arranged one behind the other in a main direction of approach to the docking device of the autonomous mobile unit.

In an embodiment of the system, the position detector is a conventional position-sensitive detector.

In an embodiment of the system, the position detector includes photodiodes.

In an embodiment of the system, the position detector includes photo transistors.

In an embodiment of the system, the transmitter includes a laser for generating the light beam.

In an embodiment of the system, the transmitter includes both a filament lamp and a Fresnel lens for generating the light beam.

In an embodiment of the system, the actuator includes an infrared sensor.

In another embodiment of the present invention, a method for docking an autonomous mobile unit at a docking device is provided, the method including the steps of: arranging one of a transmitter and a detector at the autonomous mobile unit and the other of the transmitter and the detector at the docking device; emitting a slot-shaped light beam from the transmitter, the light beam being substantially perpendicular to a drive surface of the autonomous mobile unit; detecting a position of the light beam with at least one position detector provided in the detector, the position detector being oriented substantially parallel to the drive surface; receiving data from the detector at an evaluator; evaluating a change of relative position of the light beam with respect to the detector via the evaluator; and controlling movement of the autonomous mobile unit wherein the light beam assumes a particular position on the position detector.

In an embodiment, the method further includes the steps of: providing three-wheel kinematics for the autonomous mobile unit; determining whether it is possible for the autonomous mobile unit to attain a desired docking position based on the kinematics and depending on a docking interval; and distancing the autonomous mobile unit from the docking device, if it is determined that it is not possible for the autonomous mobile unit to attain the desired docking position, sufficiently far enough to enable the autonomous mobile unit to ultimately attain the desired docking position.

In an embodiment, the method further includes the steps of: determining, in cyclical, integral brightness differences in an environment of the autonomous mobile unit; and evaluating the brightness differences as interval changes to obstacles in the environment.

In an embodiment, the method further includes the steps of: providing at least two distance measuring sensors at a side of the autonomous mobile unit; determining a distance to a wall placed to a side of the docking device using the at least two distance measuring sensors; determining a distance to the docking device using at least one further distance measuring sensor provided at the autonomous mobile unit; determining a configuration of the autonomous mobile unit from a known distance to the docking device from the wall and from the measured distance to the wall; and forming control signals for a docking procedure based on the configuration of the autonomous mobile unit.

An advantage of the described system and method consists in its provision of means by which the light beam is activated only when the autonomous unit is approaching the docking station, wherein it is possible to save energy.

Another advantage of the described system and method is that it provides two detection means for the light beam, these being consecutively arranged in a main direction of approach of the unit, so that a more precise orientation of the unit in relation to the docking device can be achieved.

Another advantage of the described system and method is that conventional position-sensitive detectors can be employed as detection means for the light beam.

Another advantage of the described system and method is that conventional photodiodes can be used for the detection of the light beam if a low resolution is permissible or if cost considerations play a role.

It is particularly advantageous that the described system and method be equipped with a laser, which makes available a rather precise punctiform light source, thus enabling a precise orientation in relation to the docking device. This laser preferably operates in the infrared region, whereby people in the vicinity of the device are not endangered.

It is particularly advantageous for the laser to operate in the pulsed mode, since an identification code for the laser can be generated with the pulsed signal.

It is also particularly advantageous in the described system and method if triggering means for the light source are provided in the form of an infrared transmitter and receiver, since these are widely used in the form of remote controls and can be produced in a cost effective manner.

It is further advantageous if an autonomous mobile unit operates with a docking method and system in which it determines its configuration relative to the docking device with the aid of the transmitted light beam and determines, with the aid of its three-wheel kinematics, if it can purposefully attain the docking device from this configuration in order to be able to dock there. If this is not the case, it distances itself therefrom autonomously and centers itself relative to the docking device. This method has the advantage in that there is no need for information of any sort about the environment of the docking device.

It is particularly advantageous in the described docking method and system that information about the environment of the docking device can be additionally exploited such that a known distance from the docking device to a sidewall is measured by the autonomous mobile unit, and the position of the docking device is deduced. With an additional distance measuring sensor with which the distance to the docking device is measured, the exact position of the unit can be detected and the docking process can be initiated.

Additional features and advantages of the present invention are described in, and will be apparent from, the Detailed Description of the Preferred Embodiments and the Drawing.

DETAILED DESCRIPTION OF THE PREFERRED EMBODIMENTS

Figure 1:
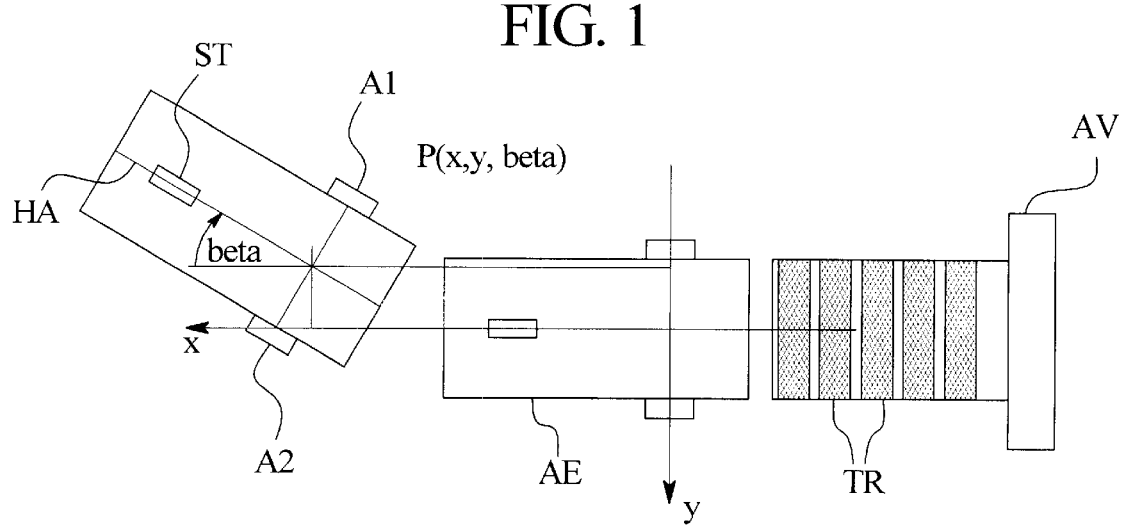
FIGS. 1 and 2 depict an autonomous mobile unit of the present invention in a docking process.
Figure 2:
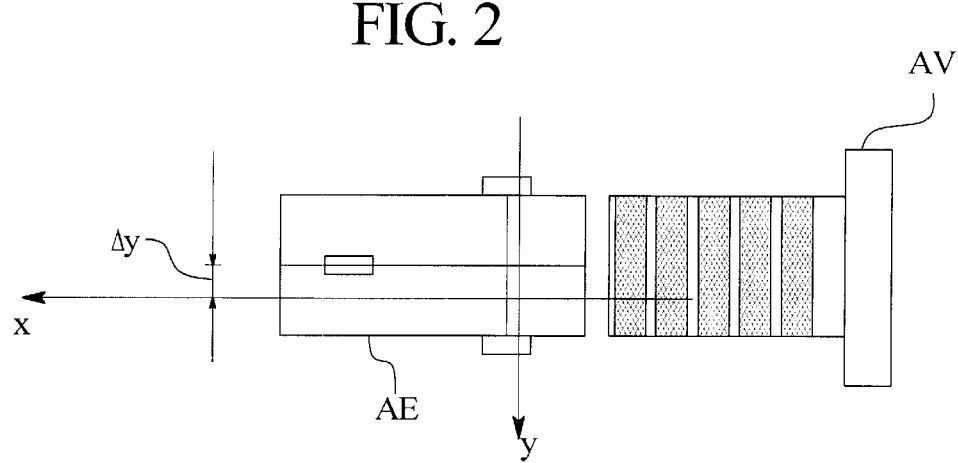

As depicted in the FIGS. 1 and 2, an autonomous mobile unit with three-wheel kinematics includes a control wheel ST and drive wheels A1 and A2. The autonomous mobile unit AE is in its docking position at a docking device AV, which includes transport rolls TR for the delivery or pickup of cargo, in a neutral position at the intersection of the system of coordinates x and y. In an arbitrary rotational position in the vicinity of the docking device AV, the autonomous mobile unit is in a configuration P(x,y,beta) with an angle of rotation beta of its main direction of approach HA to the docking device AV with respect to the x-axis. If the autonomous mobile unit is to dock at the docking device after a journey of several meters, then it is entirely possible that the error in the estimation of self-configuration is 20 cm. and the orientation error is as much as 5°. The problem thus arises that this possible position error relative to the docking device AV must be compensated. The unit must therefore determine its position relative to the docking device during docking in an exact manner. Sensors which enable a position determination relative to the docking device are required for this purpose. While the unit orients itself in the environment on its path and in the execution of its actions with ultrasound sensors and on the basis of odometry measurements, for example, this course of action is not sufficient to allow it to very precisely dock in a docking device. A specific docking device and a purposeful docking method are necessary for this. It can be derived from the above cited prior art how the unit orients itself in its environment and how it executes and evaluates actions. As FIG. 2 shows, another problem which arises in the docking process is that, conditional to its three-wheel kinematics, the unit AE cannot be maneuvered arbitrarily. If, as FIG. 2 further shows, the autonomous mobile unit AE includes a lateral displacement Δy in the immediate vicinity of the docking device AV, then this lateral displacement cannot be corrected by maneuvering measures given the simultaneous approaching of the docking device. It is therefore proposed that if such a case arises, the unit withdraws from the docking device again, whereby it centers itself in relation to the docking device in order to be able to achieve the desired end configuration in a subsequent approach process to a docking position. The drive path to the docking position already can be planned in advance from a sufficient distance from the docking device in that the three-wheel kinematics and the planning algorithms from the cited prior art are used.

Figure 3:
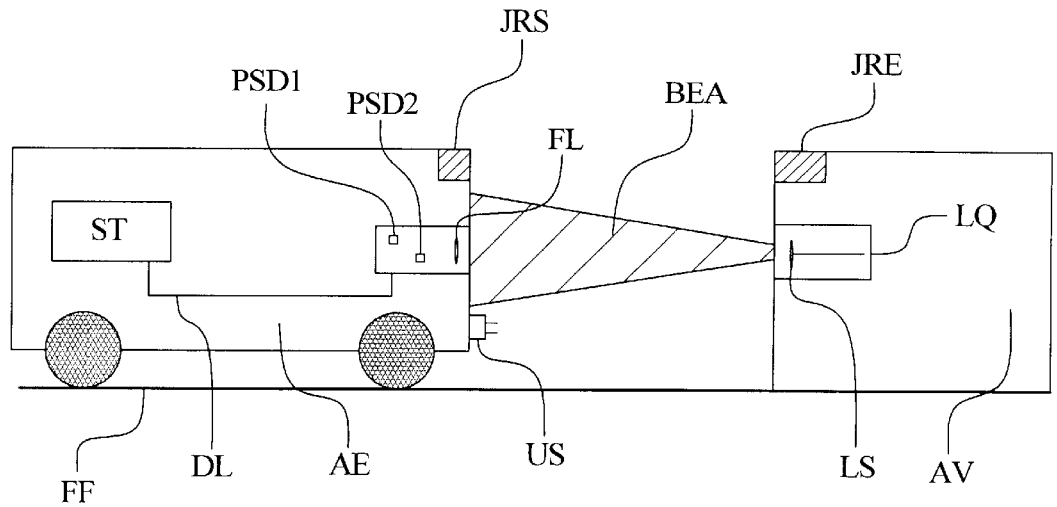
FIG. 3 depicts an exemplary embodiment of a docking device of the present invention.
Figure 4:
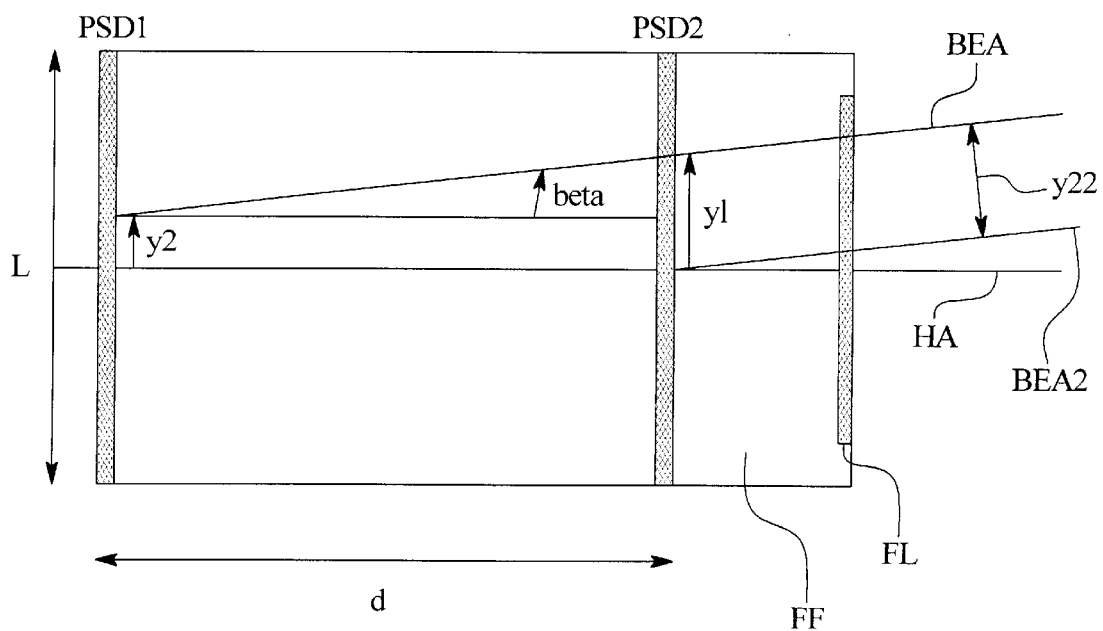
FIG. 4 details the geometric relations in the docking device.

As the embodiment of FIG. 3 shows, the docking device AV including a light source LQ whose light is fanned into a fan-shaped beam BEA, which is perpendicular to a drive surface FF of the autonomous mobile unit AE, by a cylindrical lens LS or by a slot diaphragm. In addition, an infrared receiver IRE is also provided at the docking device AV. This receiver can activate the light source LQ when it receives a signal. Sharp-focussing lasers or, respectively, infrared lasers can be employed as light source LQ. However, there are other conceivable types of light sources that allow a fan-shaped light beam. The autonomous mobile unit depicted in FIG. 3 includes a position-sensitive detector PSD1 and a position-sensitive detector PSD2, which are preferably arranged in a linear fashion perpendicular to HA and parallel to the drive surface of the unit in order to achieve a higher positional resolution, PSD1 and PSD2 allow a precise detection of the position of the fan-shaped light beam BEA, as is shown in FIG. 4. For example, a filter FL is provided at the autonomous mobile unit which only lets through light in the frequency range of the light source LQ, so that disturbances due to ambient light can be avoided. A control means ST is [sic] also provided at the autonomous mobile unit which receives, via data lines DL, current signals 11 and 12 from the position-sensitive detector PSD1, and current signals 13 and 14 from the position-sensitive detector PSD2. On the basis of these current signals, the rotational position of the unit relative to the light source LQ or, respectively, to the fan-shaped light beam BEA, can be determined, as shown in FIG. 4. The unit additionally includes an infrared transmitter IRS which can communicate with the infrared receiver IRE provided at the docking device AV in order to activate the light source LQ given an approaching of the docking device AV by the autonomous mobile unit AE. Although the version of a docking device depicted here represents the most logical embodiment, wherein the evaluation means are provided in the autonomous mobile unit which needs them for its control processes, it may also be appropriate to provide the light source in the unit, to provide the evaluating means for the position determination in the docking device, and to transmit the data to the unit by means of infrared transmitters and receivers or other communication means. The light beam is preferably fanned perpendicular to the underlay, i.e. to the drive surface of the unit FF, so that a load condition of the unit which effects a modification of the position-sensitive detectors PSD1 and PSD2 in height relative to the drive surface does not lead to an inability to execute a docking procedure. The light beam or, respectively, the laser beam is preferably pulsed so that a precise differentiation from the ambient light can be performed. For example, in the control ST an evaluating electronic for the position-sensitive detectors PSD is provided. Such electronic synchronizes itself with the pulse frequency of the laser. Instead of position-sensitive detectors, which are readily available on the market, photodiodes or phototransistors can be provided, which allow a lower resolution, though this may be sufficient for a docking process, depending on the case.

As FIG. 4 shows, the two position-sensitive detectors—or also two rows of photodiodes, as the case may be—are consecutively arranged at a distance d from one another with respect to a main direction of approach HA to the docking device of the autonomous mobile unit. The illustration in FIG. 4 shows a plan view of the drive surface FF. The light beam BEA emitted by the light source LQ passes through a filter F1 and impinges first at the position-sensitive detector PSD1 and then at the position-sensitive detector PSD2. The two position-sensitive detectors PSD1 and PSD2 include a length L in this case. In FIG. 4, the main direction of approach HA simultaneously represents the axis of symmetry of the two detectors PSD1 and PSD2; therefore, the angle beta (as the rotation of the autonomous mobile unit) can be determined from the measured distances Y1 and Y2 of the beam BEA from the main direction of approach HA in the impinging of the detectors PSD1 and PSD2, with the aid of the spacing d of the detectors. As mentioned above, the position-sensitive detectors emit a current 11 and 12 or, respectively, 13 and 14. The values y1 and y2 can be determined therefrom according to the following formulas:

$$y_1 = \frac{L}{2} \cdot \frac{I_1 - I_2}{I_1 + I_2} \tag{1}$$

$$y_2 = \frac{L}{2} \cdot \frac{I_3 - I_4}{I_3 + I_4} \tag{2}$$

beta derives from the following equation:

$$\text{beta} = a\tan((y1 - y2)/d) \tag{3}$$

In the described system and method, a filter FL is preferably provided in order to minimize the influences of ambient light and to be able to perform a more precise topical resolution of the light beam BEA.

Depending on the case, two parallel light beams BEA and BEA2 can be applied for the determination of beta; the distance y22 between which beams is known. Given the use of position-sensitive detectors, the light beams BEA and BEA2 can be activated in alternation, for example, in order to determine the projected distance between them; y1 here as well. A row of photodiodes or phototransistors also can be used wherein a defined distance is maintained from each other. This has the advantage that the two light beams can be detected simultaneously. By means of a simple characterization of the photoreceptors (for example, given an identical spacing of two immediately adjacent photoreceptors), y1 can be determined via simple multiplication of the spacing dimension by the number of photoreceptors which are situated between the two photoreceptors which detect BEA and BEA2. Since the projected spacing of the light beams changes depending on beta, beta can be determined from $$\text{beta} = \arccos(y22/y1) \tag{4}.$$

An amplifier electronic is preferably provided which conditions the signals of the detectors PSD1 and PSD2. It is first checked whether a pulsed laser light is present, and if this is the case, the corresponding distances y1 and y2 are determined from the current signals that are emitted by the detectors. For example, the amplifier electronic in the control unit ST includes a logic system which evaluates whether pulsed laser light is impinging on both position-sensitive detectors. If this is the case, the corresponding signals are forwarded to an analog-digital converter which makes the angle signal for beta available to a robot control program in the form of a digital value. With the angle beta thus determined, the autonomous mobile unit or, respectively, its control program can plan a drive path which leads the unit directly to its goal.

Figure 5:
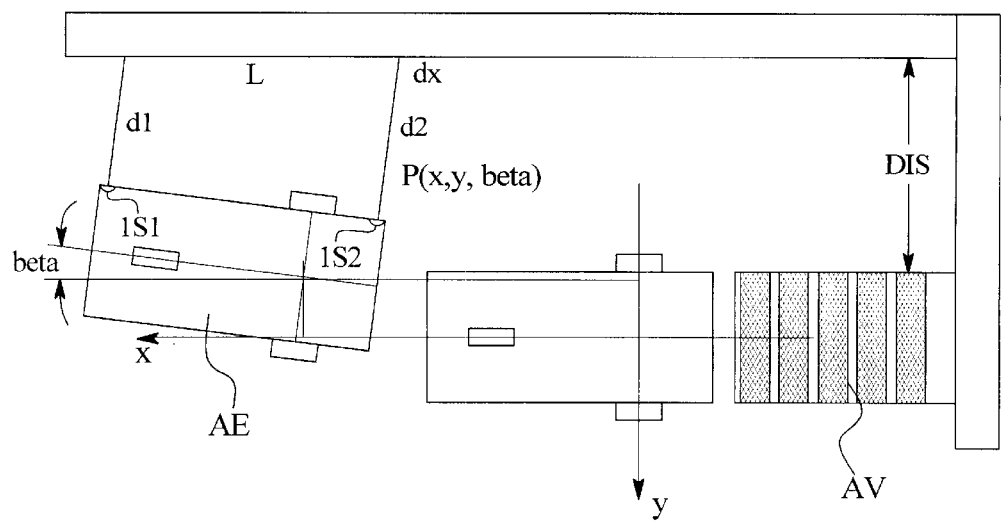
FIG. 5 illustrates the described docking method given the utilization of a sidewall.

As FIG. 5 shows, it is also possible to determine the angle beta via auxiliary means; i.e., landmarks in the environment of the docking device AV. To this end, it is merely necessary for the distance DIS of the wall W1 from the docking device AV to be known to a control computer ST of the unit. In this example, the autonomous mobile unit AE approaches the docking device AV backwards and measures the wall distance d1 and d2 with laterally arranged sensors 1S1 and 1S2. The angle beta can be determined from the two distances and the length L between the two sensors via known angle functions. The unit can determine the distance to the docking device with an ultrasound sensor US which is provided at its back side, which has already been shown in FIG. 3, and can plan a drive path for docking at the docking device both from this and from the angle beta.

Figure 6:
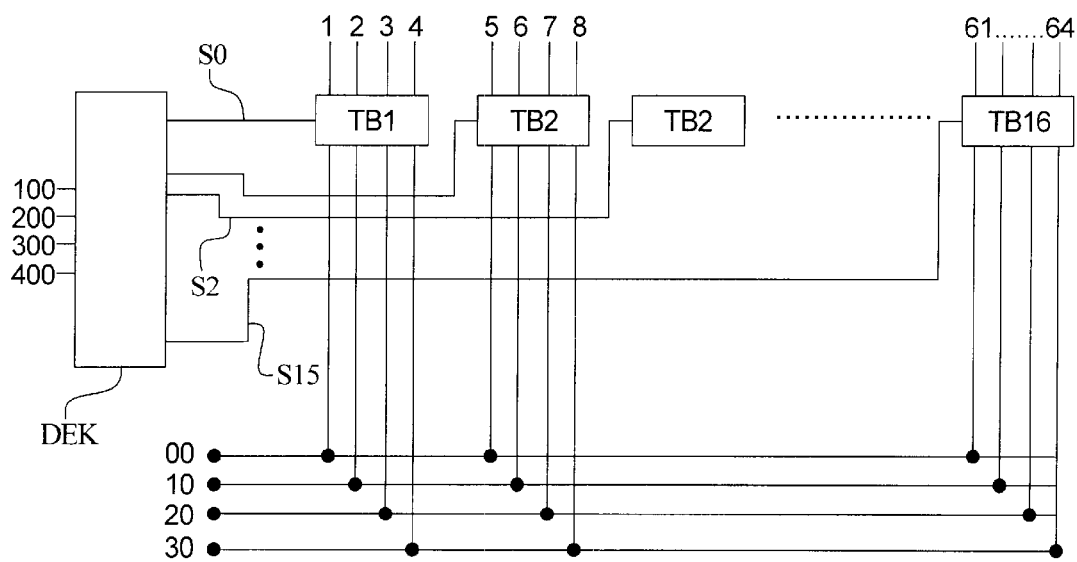
FIG. 6 depicts a circuit construction for the evaluation of the signals of photodiodes as detection means.

As FIG. 6 shows, in an evaluating means for signals of photodiodes 1 to 64, their signals S0 to S15m, which are amplified by driver modules TB1 to TB16, can be evaluated by a decoder. This decoder includes digital outputs 100 to 400, for example, while the overall circuit has analog inputs 00 to 30. In this case, photodiodes 1 to 64 are provided as detectors which have a topical resolution of 2 to 3 mm. Preferably, 48 diodes can be arranged in succession and another 16 above these in the center so as to be displaced relative to the lower ones by half the width of a diode. This second, shorter photodiode row serves to increase the precision in the middle region in order to enable an exact positioning of the laser beam onto the center of the detectors. The evaluation of the signals of the individual photodiodes occurs in a loop which interrogates the signals of the driver modules TB1 to TB16 in succession and which determines the odometry data subsequent to the interrogation of all 64 photodiodes in order to determine therefrom the position or orientation of the autonomous mobile unit.

Figure 7:
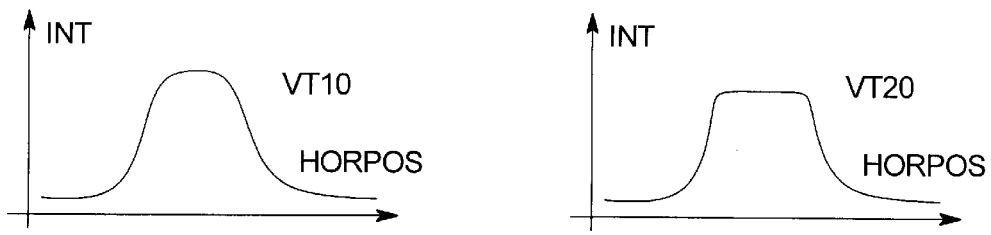
FIG. 7 depicts favorable brightness characteristics.
Figure 8:
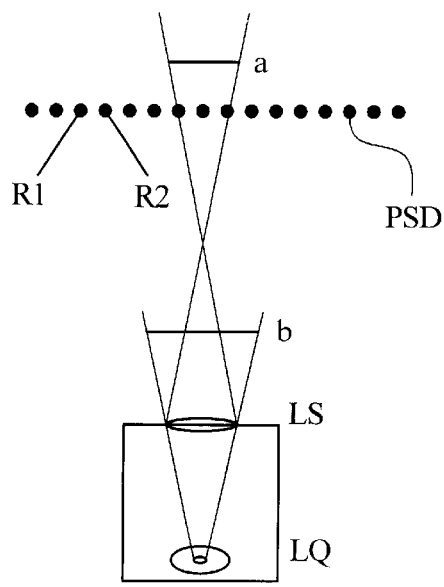
FIG. 8 depicts a further exemplary embodiment of a docking device of the present invention.

FIGS. 7 and 8 illustrate details of a further variation of the present invention. [ . . . ] The terms "robot" and "autonomous mobile unit" should be understood as synonymous. The solution described there is quite economical compared to other ones and the active surface of the sensor can be designed arbitrarily large. A robot is thus more readily in the position to drive into the expanded range of influence of the sensor. Conditioned by the principle, this solution has smaller dimensions than a laser variant. This applies above all to the installation depth. Due to its large reception range, it can be used for other localization tasks with autonomous robots. It is, therefore not strictly usable in the vicinity of docking devices and it permits a simultaneous analysis of a plurality of light beams. [sic]

The solution can be broken down into six parts:

light beam generation method of data capture method of capturing direction information method of capturing distance information evaluation algorithms possibility to combine with optical push rod Light Beam Generation Here, an optimal light beam consists of a bundled light beam which satisfies the following requirements, regardless of the distance to the light beam projector:

1. The beam does not exceed the maximum allowable width in the working region.
2. The beam has a sufficient intensity throughout the working region.
3. The beam is not sharply limited laterally, but has a more or less broad maximum in the middle, and its light intensity decreases proceeding to the sides.
4. The beam requires a homogenous shape which makes the distribution of light intensity within a defined working region independent of the vertical position of the sensor.

The specific construction of the sensor allows it to use a more cost-effective light source. In the given case, a thread-like spiral-wound filament is used (FIG. 8, LQ) such as is used in tubular lamps, wherein [ . . . ] the spiral-wound filament stands perpendicular to the plane of projection of the drawing. In the far region, a light beam (b) which meets the requirements is generated by the imaging of the spiral-wound filament through a lens (FIG. 8, LS). In the near region, a suitable beam (a) is generated using a diaphragm. The basic idea of the beam generation method is to use a Fresnel lens of suitable width as a combination of lens and diaphragm and thus to obtain a beam that corresponds to the above described requirements.

The light intensity distribution in the beam has a significant influence on the precision of the overall sensor. For this reason, FIG. 7 depicts a few favorable beam profiles. The intensity INT is given above, and the horizontal coordinate HORPOS is given on the right. They include an acute beam shape at VT10, on one hand, and a plateau-type beam shape at VT20 on the other hand. A good topical detection of the beam by the photoreceptors is thus possible, given a sufficient intensity difference from the stray light.

Data Acquisition Method

The sensor senses the brightness distribution of the light beam which impinges on the active sensor region. A row of phototransistors or other radiosensitive elements are used for this purpose. A particularly simple and cost-effective digital selector circuit is used which merely switches the supply voltage of the individual phototransistors; in the exemplary embodiment, a shift register which can be expanded to arbitrary lengths. This voltage allows a current to flow through a measuring resistor via the phototransistor and a decoupling diode. The voltage dropping at this resistor is amplified and fed to a computer for evaluation. This circuit enables the brightness distribution to be measured over the whole active surface. The density of the measurement points corresponds to the spacing of the phototransistors. Given a suitable signal, the evaluation algorithm enables a positional resolution that is appreciably better than the measurement point spacing.

Method for the Acquisition of Directional Information

An important item of information for the determination of the position of a vehicle is the position from which the light beam is coming. In order to be able to acquire this information, the photosensitive receivers are so handled that they include different directional characteristics. An example of this would be the attachment of a row of receivers which are attached so as to be rotated 45 degrees to the right and 45 degrees to the left in alternation. FIG. 8 illustrates this by means of orientations R1 and R2 of two neighboring sensors. Depending on the directional characteristic of the photoreceptors, other angles of rotation are possible besides 45 degrees. The natural directional characteristic of most receivers is thus exploited. Another possibility is the attachment of diaphragms either as moving diaphragms or as one or more rows of fixed diaphragms. The first variant has the advantage that the sensor need not have a great depth. An evaluating algorithm compares the signals of the variously oriented sensor elements and determines the direction of the incoming beam from this. Given moving diaphragms, the beam direction also can be determined from the position of the diaphragm relative to the sensor field. The sensor field can itself be used for determining the position of the diaphragm, which is then provided with an LED.

Another method for determining direction consists in the analysis of two parallel beams. From the measured spacing of these beams on the sensor field and their actual spacing, the amount of the angular deviation from the perpendicular direction of incidence can be determined.

Method for the Acquisition of Distance Information

To determine the interval from the sensor to the beam source, different methods can be used. One method is based on the use of a plurality of beams. If these beams do not extend in parallel, then the distance can be deduced from the spacing of the beams and from the angle they form with each other. This method also can be combined into a three-beam method. There are different possibilities of beam system and method here. Another method for measuring the interval is the analysis of light intensity distribution in the light beam. The farther the robot is from the focal spot of the beam, the wider the light beam generally is.

Evaluation Algorithms

The evaluation of the light intensity distribution plays an important role in the sensor principle. To determine the position, the background brightness is first subtracted. This can be determined by a comparison measurement given a deactivated beam or by interpolation over the sensor region that is not impinged by the light beam. The result is referred to hereinafter as "signal intensity distribution." First, local maxima in the signal intensity distribution are sought and, with the aid of plausibility criteria, as many maxima are selected as there are light beams that will impinge at the sensor. The position of the light beam is determined via correlation or center-of-gravity algorithms. An appropriate beam shape is important in order to achieve a high positional precision. To determine the direction of incidence of the light beam, either a plurality of beams can be utilized, or the signal intensities of the receive elements are related, these being located in the same horizontal position though including different directional characteristics.

Optical Push-Rods

Besides a sensor for position detection, autonomous robots also require protection against collision with objects, walls, furniture and people. One possibility to guarantee such a protection is to use optical methods. A combination of the following effects can be used here:

1. Dark objects shade out environmental light which impinges at a sensor when they approach the sensor. Since the described sensor also receives environmental light, the robot can ascertain at which locations objects come so close to the sensor that the environmental light is shaded and there exists a danger of collision.

2. Bright objects reflect light. If the described sensor is equipped with additional switchable light-emitting elements such as LEDs, then it can be ascertained whether and at what location there are diffusely reflecting objects present in the vicinity of the sensor. To this end, the measured brightness given an activated LED is compared to that given a deactivated LED.

If the active sensor surface is selected large enough—so large that it surrounds the entire perimeter of the robot, for example—then collisions can be avoided. This method offers the following advantages compared to mechanical collision sensors:

a. Collisions can be ascertained before there is mechanical contact.

b. The exact position of the collision can be detected.

c. The analog character of the signal enables it to ascertain whether collision resolution strategies undertaken by the robot control system improve the situation or worsen it.

FIG. 8 illustrates the principal construction of the sensor system. The light source LQ can be seen here which consists of the spiral-wound filament and lens which simultaneously act as a diaphragm. FIG. 8 illustrates the sensor that is attached at the robot in the form of a row of phototransistors PSD. Transistors can be saved if the transistor density in the margin regions is lower; i.e., the transistor spacing is selected greater. Infrared transmitting diodes also can be provided. These diodes can be used for communication with the light-beam generator, on one hand, and for purposes of an optical push-rod, on the other hand. It is likewise possible to accommodate the transmitting diodes on the same level as the receiving diodes. This has advantages given their use as optical push-rods.

Figure 9:
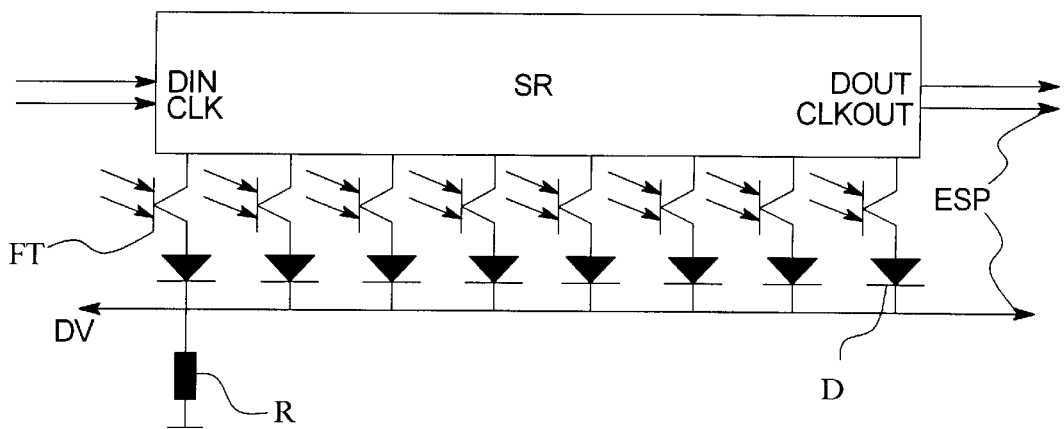
FIG. 9 depicts a circuit construction for the evaluation of the signals of phototransistors as detection means.

In the evaluating circuit in FIG. 9, a digital shift register SR with high output drive power is used as a control circuit. This can be expanded to an arbitrary length EX by addition. It is thus possible to generate arbitrary combinations of 0V or 5V at the outputs of the shift register. For normal operation, the shift register is first cleared. A single 5V value is then inserted via its input DIN. This is shifted from one output to the other, depending on a time cycle CLK, so that a single transistor FT is respectively supplied with an operating voltage of 5V. This transistor is the active transistor. The amount of light which impinges on the active transistor determines the current which flows through each of the transistor, the diode D and the measuring resistor R to ground. A voltage drop, which can be delivered to DP, thus appears at the measuring resistor. This voltage drop is amplified via an operationals amplifier (not illustrated) and is acquired by the computer via an A/D converter (not illustrated). But it is advantageous here to use a diaphragm which screens out direct light from ceiling lamps in order to improve the range and to be able to use weaker light beams. Based on the directional characteristic, the beam direction can be detected from the comparison of neighboring transistors. The transistor which is more perpendicular to the beam measures higher brightness values. A more favorable arrangement is one in which a plurality of rows of transistors are used, since the inhomogeneous brightness distribution in the light beam need not be compensated in the evaluation. For reasons relating to production technology, it is possible here to construct four rows. Row 1 consists of transistors which are tilted 90 degrees to the left; row 2 consists of planar transistors that are soldered on; row 3 consists of light-emitting elements; and row 4 consists of transistors that are tilted 90 degrees to the right. Two such groups of four respectively can be controlled by one control circuit of the type 74AC164. The subassembly can be soldered onto flexible film motherboards and produced in sufficient lengths to attach all the way around the robot as a push-rod. If visible wavelengths are selected for the light-emitting elements, then the sensor also can be used for purposes of warning, advertising, or providing information (e.g., as a blinker).

Although the present invention has been described with reference to specific embodiments, those of skill in the art will recognize that changes may be made thereto without departing from the spirit and scope of the invention as set forth in the hereafter appended claims.

What is claimed is:

1. A system for positioning an autonomous mobile unit for docking, comprising:
   a transmitter and a detector arrangement, wherein one of the transmitter and the detector arrangement is arranged at the autonomous mobile unit and the other of the transmitter and the detector arrangement is arranged at a docking device, the transmitter emitting a slot-shaped light beam which is substantially perpendicular to a drive surface of the autonomous mobile unit, the detector arrangement including at least one position detector which is oriented substantially parallel to the drive surface, the detector arrangement for detecting a position of the light beam;
   an evaluator which receives data from the detector arrangement and evaluates a change of relative position of the light beam with respect to the detector arrangement to control movement of the autonomous mobile unit wherein the light beam assumes a predetermined position on the detector arrangement; and
   three-wheel kinematics, wherein it is determined whether it is possible for the autonomous mobile unit to attain a desired docking position based on the kinematics and depending on a docking interval, and the autonomous mobile unit is distanced from the docking device, if it is determined that it is not possible for the autonomous mobile unit to attain the desired docking position, sufficiently far enough to enable the autonomous mobile unit to ultimately attain the desired docking position.

2. A system for positioning an autonomous mobile unit for docking as claimed in claim 1 further comprising an actuator for activating the transmitter given a failure to exceed the docking interval.

3. A system for positioning an autonomous mobile unit for docking as claimed in claim 1, wherein the detector arrangement includes at least two position detectors arranged one behind the other in a main direction of approach to the docking device of the autonomous mobile unit.

4. A system for positioning an autonomous mobile unit for docking as claimed in claim 1, wherein the position detector is a conventional position-sensitive detector.

5. A system for positioning an autonomous mobile unit for docking as claimed in claim 1, wherein the position detector includes photodiodes.

6. A system for positioning an autonomous mobile unit for docking as claimed in claim 1, wherein the position detector includes photo transistors.

7. A system for positioning an autonomous mobile unit for docking as claimed in claim 1, wherein the transmitter includes a laser for generating the light beam.

8. A system for positioning an autonomous mobile unit for docking as claimed in claim 1, wherein the transmitter includes both a filament lamp and a Fresnel lens for generating the light beam.

9. A system for positioning an autonomous mobile unit for docking as claimed in claim 2, wherein the actuator includes an infrared sensor.

10. A method for docking an autonomous mobile unit at a docking device, the method comprising the steps of:
    arranging one of a transmitter and a detector arrangement at the autonomous mobile unit and the other of the transmitter and the detector arrangement at the docking device;
    emitting a slot-shaped light beam from the transmitter, the light beam being substantially perpendicular to a drive surface of the autonomous mobile unit;
    detecting a position of the light beam with the detector arrangement, the detector arrangement including at least one position detector oriented substantially parallel to the drive surface;
    receiving data from the detector arrangement at an evaluator;
    evaluating a change of relative position of the light beam with respect to the detector arrangement via the evaluator;
    controlling movement of the autonomous mobile unit wherein the light beam assumes a predetermined position on the position detector;
    providing three-wheel kinematics for the autonomous mobile unit;
    determining whether it is possible for the autonomous mobile unit to attain a desired docking position based on the kinematics and depending on a docking interval; and
    distancing the autonomous mobile unit from the docking device, if it is determined that it is not possible for the autonomous mobile unit to attain the desired docking position, sufficiently far enough to enable the autonomous mobile unit to ultimately attain the desired docking position.

11. A method for docking an autonomous mobile unit at a docking device, the method comprising the steps of:
    arranging one of a transmitter and a detector arrangement at the autonomous mobile unit and the other of the transmitter and the detector arrangement at the docking device;
    emitting a slot-shaped light beam from the transmitter, the light beam being substantially perpendicular to a drive surface of the autonomous mobile unit;
    detecting a position of the light beam with the detector arrangement, the detector arrangement including at least one position detector oriented substantially parallel to the drive surface;
    receiving data from the detector arrangement at an evaluator;
    evaluating a change of relative position of the light beam with respect to the detector arrangement via the evaluator;
    controlling movement of the autonomous mobile unit wherein the light beam assumes a predetermined position on the position detector;
    determining, in cyclical fashion, integral brightness differences in an environment of the autonomous mobile unit; and
    evaluating the brightness differences as interval changes to obstacles in the environment.

12. A method for docking an autonomous mobile unit at a docking device, the method comprising the steps of:
    providing at least two distance measuring sensors at a side of the autonomous mobile unit;
    determining a distance to a wall placed to a side of the docking device using the at least two distance measuring sensors;
    determining a distance to the docking device using at least one further distance measuring sensor provided at the autonomous mobile unit;
    determining a configuration of the autonomous mobile unit from the distance to the docking device and from the measured distance to the wall; and
    forming control signals for a docking procedure based on the configuration of the autonomous mobile unit.

13. A system for positioning an autonomous mobile unit for docking, comprising:

a transmitter and a detector arrangement, wherein one of the transmitter and the detector arrangement is arranged at the autonomous mobile unit and the other of the transmitter and the detector arrangement is arranged at a docking device, the transmitter emitting a slot-shaped light beam which is substantially perpendicular to a drive surface of the autonomous mobile unit, the detector arrangement including at least one position detector which is oriented substantially parallel to the drive surface, the detector arrangement for detecting a position of the light beam; and an evaluator which receives data from the detector arrangement and evaluates a change of relative position of the light beam with respect to the detector arrangement to control movement of the autonomous mobile unit wherein the light beam assumes a predetermined position on the detector arrangement, wherein integral brightness differences in an environment of the autonomous mobile unit are determined in cyclical fashion, and the brightness differences as interval changes to obstacles in the environment are evaluated.

14. A system for positioning an autonomous mobile unit for docking as claimed in claim 13, further comprising:

means for determining a docking interval between the autonomous mobile unit and the docking device; and an actuator for activating the transmitter given a failure to exceed the docking interval.

15. A system for positioning an autonomous mobile unit for docking as claimed in claim 13, wherein the detector arrangement includes at least two position detectors arranged one behind the other in a main direction of approach to the docking device of the autonomous mobile unit.

16. A system for positioning an autonomous mobile unit for docking as claimed in claim 13, wherein the position detector is a conventional position-sensitive detector.

17. A system for positioning an autonomous mobile unit for docking as claimed in claim 13, wherein the position detector includes photodiodes.

18. A system for positioning an autonomous mobile unit for docking as claimed in claim 13, wherein the position detector includes photo transistors.

19. A system for positioning an autonomous mobile unit for docking as claimed in claim 13, wherein the transmitter includes a laser for generating the light beam.

20. A system for positioning an autonomous mobile unit for docking as claimed in claim 13, wherein the transmitter includes both a filament lamp and a Fresnel lens for generating the light beam.

21. A system for positioning an autonomous mobile unit for docking as claimed in claim 14, wherein the actuator includes an infrared sensor.

\* \* \* \* \*